(No Model.)
S. LINTHICUM, Jr.
COMBINED LAND MARKER, FURROWER, AND COVERER.
No. 542,483. Patented July 9, 1895.
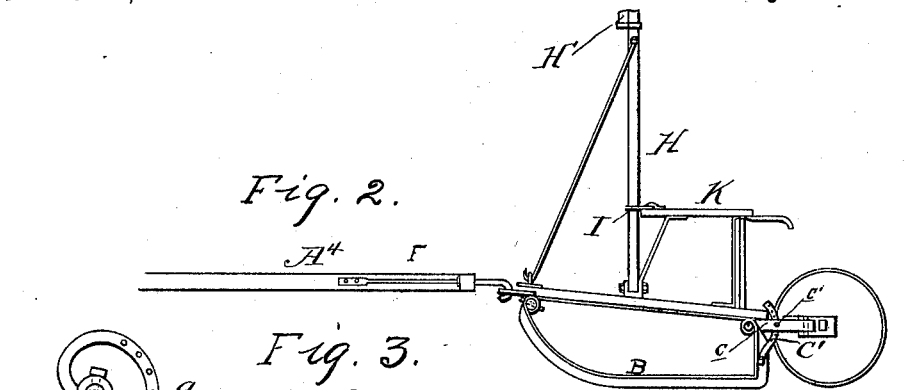
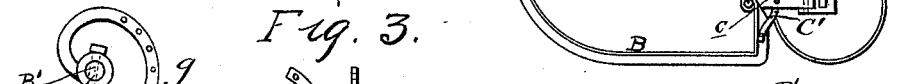
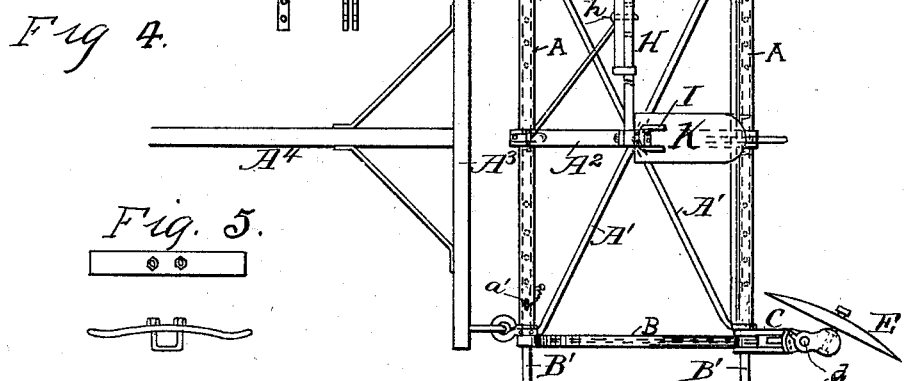
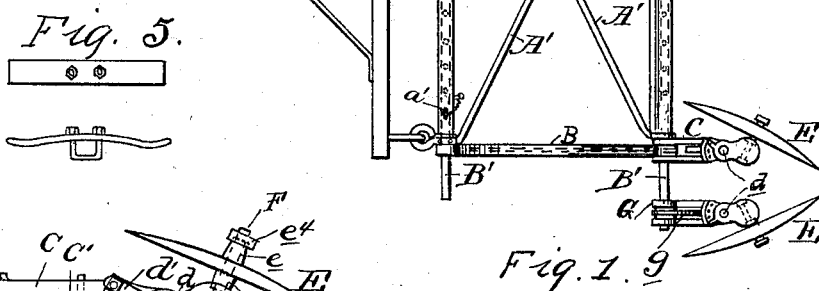
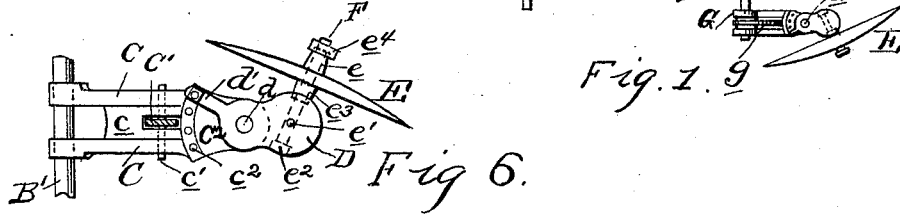
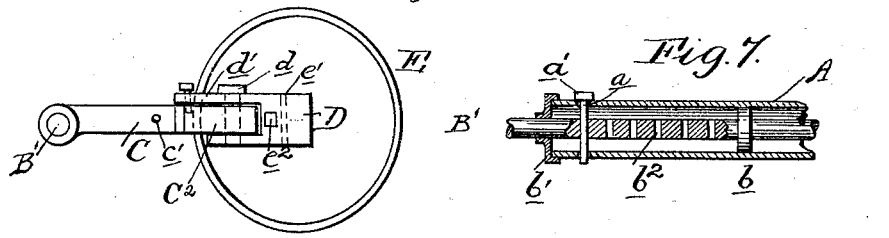
WITNESSES:
G. A. Pennington
D. G. Stuart
INVENTOR
Sweetser Linthicum Jr.
BY
L. S. Bacon
ATTORNEY.

UNITED STATES PATENT OFFICE.

SWEETSER LINTHICUM, JR., OF WELLHAM'S CROSS ROADS, MARYLAND.

COMBINED LAND MARKER, FURROWER, AND COVERER.

SPECIFICATION forming part of Letters Patent No. 542,483, dated July 9, 1895.

Application filed March 1, 1895. Serial No. 540,153. (No model.)

*To all whom it may concern:*

Be it known that I, SWEETSER LINTHICUM, Jr., a citizen of the United States, residing at Wellham's Cross Roads, in the county of Anne Arundel and State of Maryland, have invented certain new and useful Improvements in a Combined Land Marker, Furrower, and Coverer; and I do hereby declare the following to be a full, clear, and exact description of the invention, such as will enable others skilled in the art to which it appertains to make and use the same.

This invention relates to an improvement in combined land markers, furrowers, and coverers; and it consists in the construction and arrangement of parts hereinafter described, and definitely pointed out in the claims.

The aim and purpose of the invention are the provision of an improved machine of the nature above indicated which will be susceptible of quick and easy adjustment of the members, be compact, rigid, and embody structural simplicity and durability, as well as being cheaply manufactured.

The objects of the invention are attained by the construction illustrated in the accompanying drawings, wherein like letters of reference indicate corresponding parts in the several views, and in which—

Figure 1 is a plan view of the machine. Fig. 2 is a side elevation. Fig. 3 is a detail view of one form of adjusting-bracket. Fig. 4 is a detail view of another form of adjusting-bracket. Fig. 5 is a detail view of the marking-finger. Fig. 6, detail views of the disk arm and holder, showing the same in top plan and side elevation; and Fig. 7 is a detail section through one of the tubular end bars.

In the drawings, A A designate two parallel tubular end bars of the frame, connected by diagonal bars or braces A' and centrally by a cross-bar $A^2$, the bars A by this means being held securely in parallel relation. In the outer ends of the bars A are formed suitable apertures $a$ and have connected thereto, by suitable chains, the locking-pins $a'$, adapted to fit in the apertures. To secure a proper draft the tongue cross-tree $A^3$ is secured to the extreme outer ends of the forward bar A and extends substantially the length thereof, the tongue $A^4$ being secured and suitably braced thereto.

The frame as above described is of a length substantially that of the minimum width between the rows of seed to be planted, and to secure a positive variation in the width of the rows I form the runner members B and secure their opposite ends rigidly on telescopic extensions B', which latter project into the tubular bars A. These extensions are of a diameter less than the diameter of the bars and are made to closely fit therein to prevent lateral movement by having on their inner ends the collars $b$ and forming reducing-rings $b'$ on the ends of the tubes, as shown in Fig. 7. The extensions B' have a series of apertures $b^2$ therein, adapted to register with the apertures $a$ in the tubes A. To secure the runners B to the extensions the flat or T heads of the runners are turned over the extensions and are bolted thereto in any desirable manner. By this means it will be observed that the usual cross-bar is omitted.

Heretofore in the construction of the runners of T-iron it has been customary to have a perpendicular forward portion curving abruptly at its lower ends and extending rearward. The object of this abrupt turn was primarily to overcome the tilting tendency of the runners caused by the draft and the position of the driver. The objection to the construction is that the abrupt turn tends to bunch or gather the fertilizer, straw, or other matter, and thereby distribute it unevenly. To overcome this objection, I curve the forward ends of the runners directly from the point of connection downward and back to a point substantially the center thereof, and the rear ends I carry up perpendicularly to a plane below the plane of the forward end and by this means incline the frame proper and throw the load more directly on the rear of the runners. The gradual curve of the forward end of the runners serves to carry the material over the surface and embed it therein without bunching.

The extensions B' at the rear are projected beyond the runners for purposes hereinafter stated.

C designates the disk-arms which are formed of two parallel arms spaced apart, connected at their outer ends by an apertured web $c$, their inner ends being formed with circular bearings sleeved on the extensions B' on opposite sides of the connected portion of the runner. The runner being fixedly secured on the extension prevents the longitudinal movement of the arm, so that the arm has simply a vertical pivotal movement.

To retain the arm in its adjusted vertical positions a perforated segmental tongue C' is secured to the flange of the runner and extends through the perforations in the web $c$ of the arm. Suitable lateral perforations are made through the arm, in which are placed the removable pins $c'$, the same passing through an aperture in the tongue. On the outer end of the arm is formed a segmental series of perforations $c^2$ and a flat curved bearing-plate $C^3$ having a central perforation.

D designates the bearing-block for the disk, the same being bifurcated and projecting above and below the plate $C^2$, the same being pivotally secured to the latter by bolts $d$. Extending radially from the upper bifurcated arm of the block D is a finger $d'$ having a perforation therein which registers with the perforation $c^2$, and a suitable pin is removably seated in the perforation to lock the disk in its proper angular position.

The disk E is formed with oppositely-extending hub-sections $e$ and is mounted on the shaft F, which passes through the block D diagonally and is held therein by a bolt $e'$ and from rotation by a squared head $e^2$ seated in a squared socket in the block.

Opposite the squared socket of the block is a cylindrical socket $e^3$, in which the inner hub of the disk fits so that a dust-tight joint is formed. The disk is held in place by a suitable nut $e^4$ on the shaft, the same being recessed to overlap the end of the hub. The construction and arrangement of the disk are alike on the opposite end.

When it is desired to use a covering-disk in connection with the furrowing-disk, I place the disk-carrying arm with the disk in the reverse order to those of the furrowing-disks on the outer ends of the rear extensions B', as shown at G, Fig. 1, it being understood that there is to be one on each end of the extensions B'.

To secure the arms in place on the extensions, the same being beyond the runners, I employ the segmental tongues $g$, as shown in Fig. 4, the same having circular bearings $g'$ at their ends sleeved on the ends of the extensions between the arms C and when in the proper position bolt them to the extensions. The perforated section of the segment passes downward through the web $c$ and receives the pins $c'$ passing through the same.

H designates the marker-arm pivoted centrally to the frame, and having the extension H' thereon adjustably secured by the pin $h'$, which engages suitable apertures in the arms.

When it is desired to hold the arm in an elevated position, a suitable U-clasp I, which is pivoted to the seat K, is thrown forward embracing the sides of the arms.

In operation, it is only necessary to remove the pins $a'$ and draw out the extensions B' until one of the inner apertures of the extensions registers with the outer apertures of the bars A. The pins are then replaced and finally lock the runners in their adjusted positions.

In Fig. 5 I have shown the preferred form of marking-finger adapted to be fitted on the outer extension H' of the marking-arm H.

It is evident that many minor changes in the parts above described can be made and substituted for those referred to without in the least departing from the nature and principle of my invention.

Having thus described my invention, what I claim as new, and desire to secure by Letters Patent, is—

1. The combination with a frame, of laterally adjustable extensions thereon, and runners consisting of T-iron having their forward ends rigidly secured to the forward extensions and curved from the point of connection downward and rearward having their rear ends extending upward to a point on a plane below the plane of the forward ends and secured to the rear extensions, a draft connection at the forward end of the machine, and adjustable disks secured to the rear extensions, substantially as described.

2. The combination with laterally adjustable runners, of upwardly extending segmental tongues fixedly secured directly on the runners and having perforations therein, of vertically adjustable disk carrying arms having apertures through which the tongue passes, pins for securing the arms in place, and adjustable disks on the outer ends of the arms, substantially as described.

3. The combination with the adjustable runners, of stationary curved segments having perforations therein, a vertically adjustable disk carrying arm, having a vertical opening therein through which the segment passes, pins passing through the arms and segments, a horizontal bearing plate on the outer end of the arm having a segmental series of apertures therein, a bearing block, pivotally secured on the plate having an apertured finger registering with the apertures of the plate, pins passing through the apertures, a shaft fixedly secured to the bearing block, a disk mounted on the shaft, and means for securing the disk in place, substantially as described.

4. The combination with tubular end bars of the frames, of extensions slidingly and adjustably secured therein, means for uniting the outer end of the extensions comprising curved runners rigidly secured at opposite ends to the extension, disk carrying arms having bifurcated inner ends, loosely sleeved on the rear extensions and spanning the rear ends of the runners, disks on the arms, and means for vertically adjusting the disks, substantially as described.

5. The combination with the vertically adjustable disk carrying arms, of a laterally adjustable bearing block secured thereon, a shaft passing through the block and rigidly secured, a disk on the shaft, having oppositely extending hubs, the inner hub projecting into a socket in the block and a securing means on the opposite end of the shaft engaging the opposite hub, substantially as described.

6. The combination with the frame having tubular end bars, of extensions telescoped therein and projecting beyond the same, means for adjusting the extensions, runners at the ends of the extensions rigidly secured at opposite ends thereto, disk carrying arms pivoted on the extensions at the rear ends of the runners, disks on the arms, and supplemental disk carrying arms on the outer ends of the rear extensions adjustably secured in position and carrying suitable disks, substantially as described.

In testimony whereof I affix my signature in presence of two witnesses.

SWEETSER LINTHICUM, JR.

Witnesses:
G. A. PENNINGTON,
L. S. BACON.